UNITED STATES PATENT OFFICE.

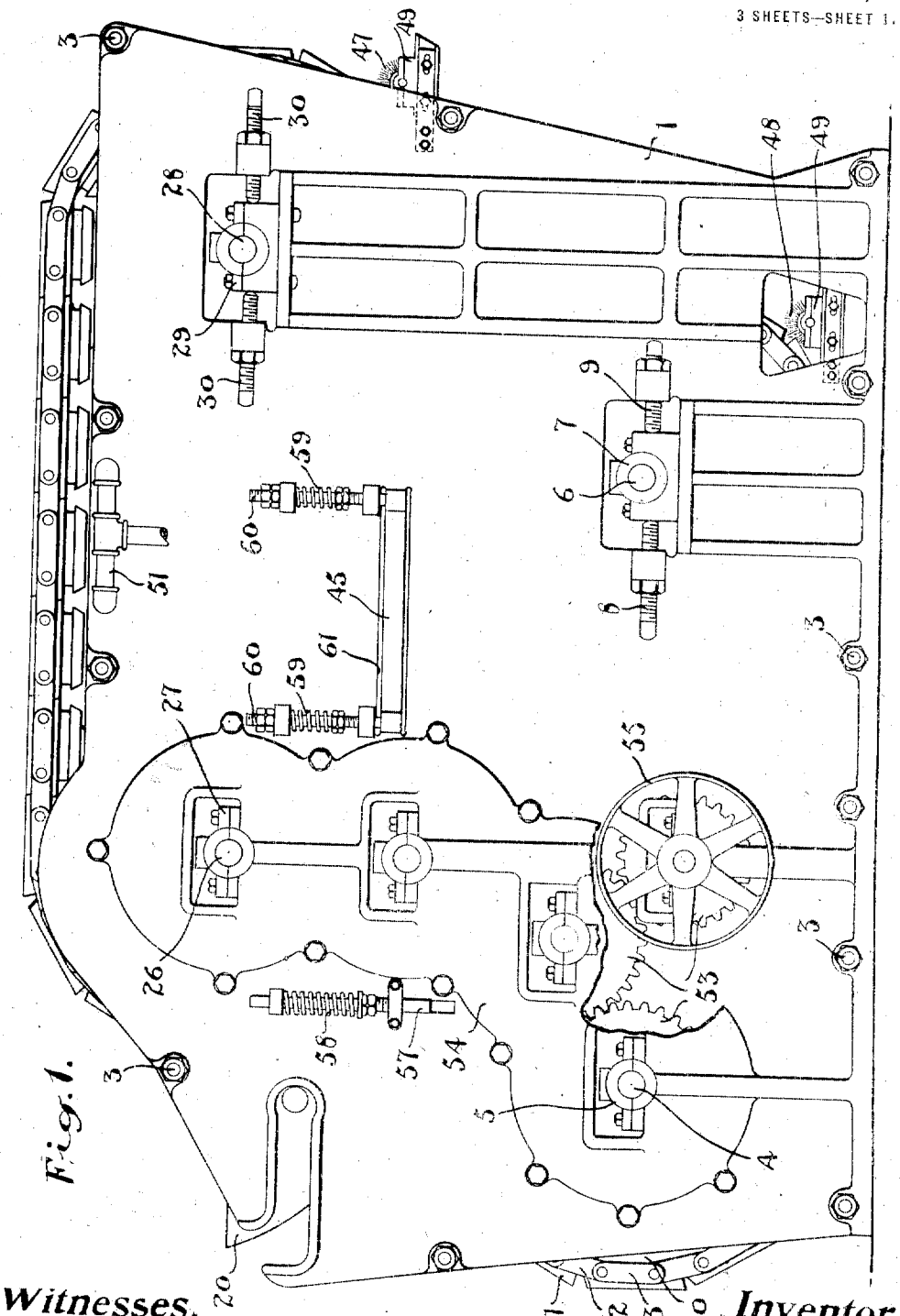

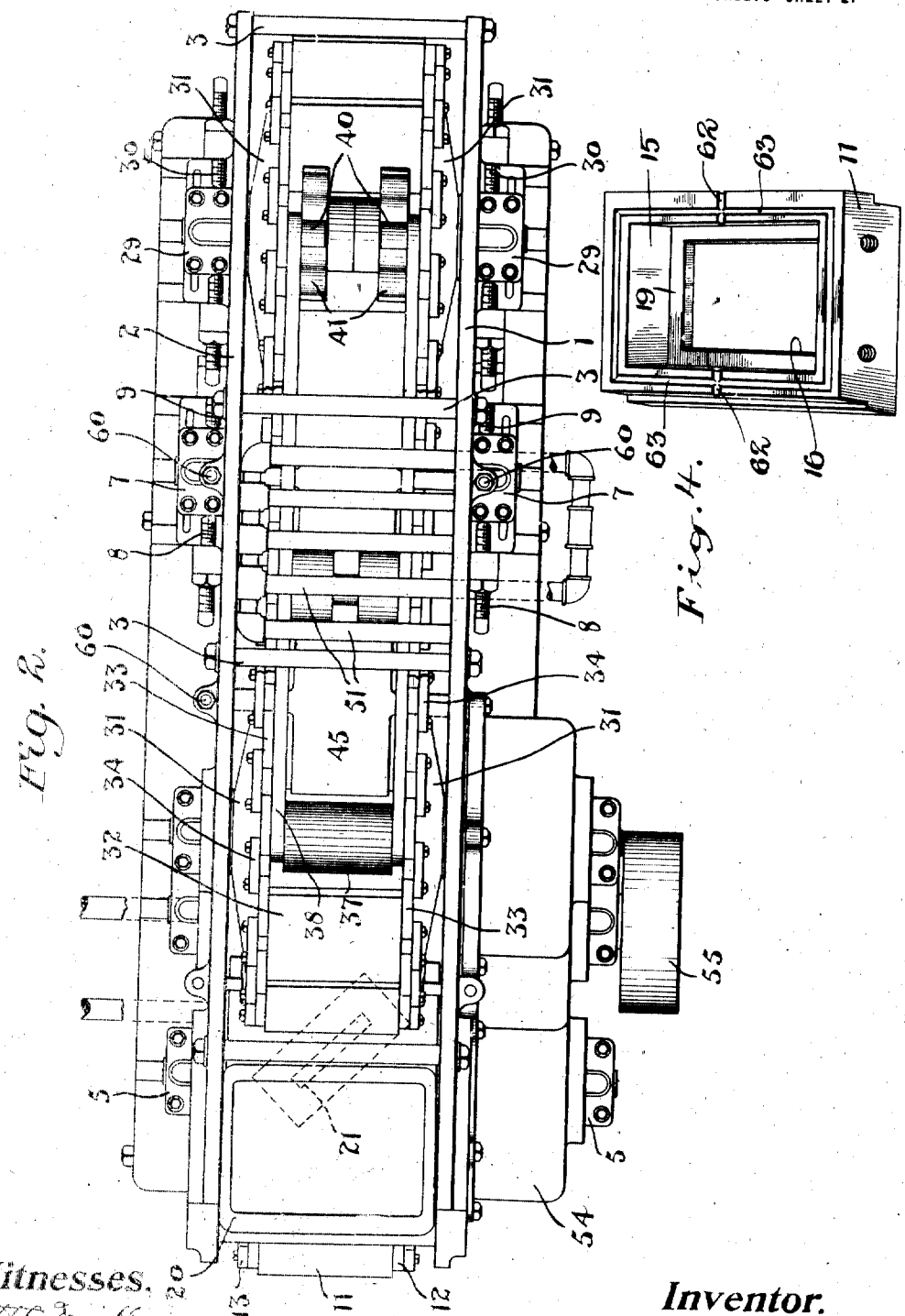

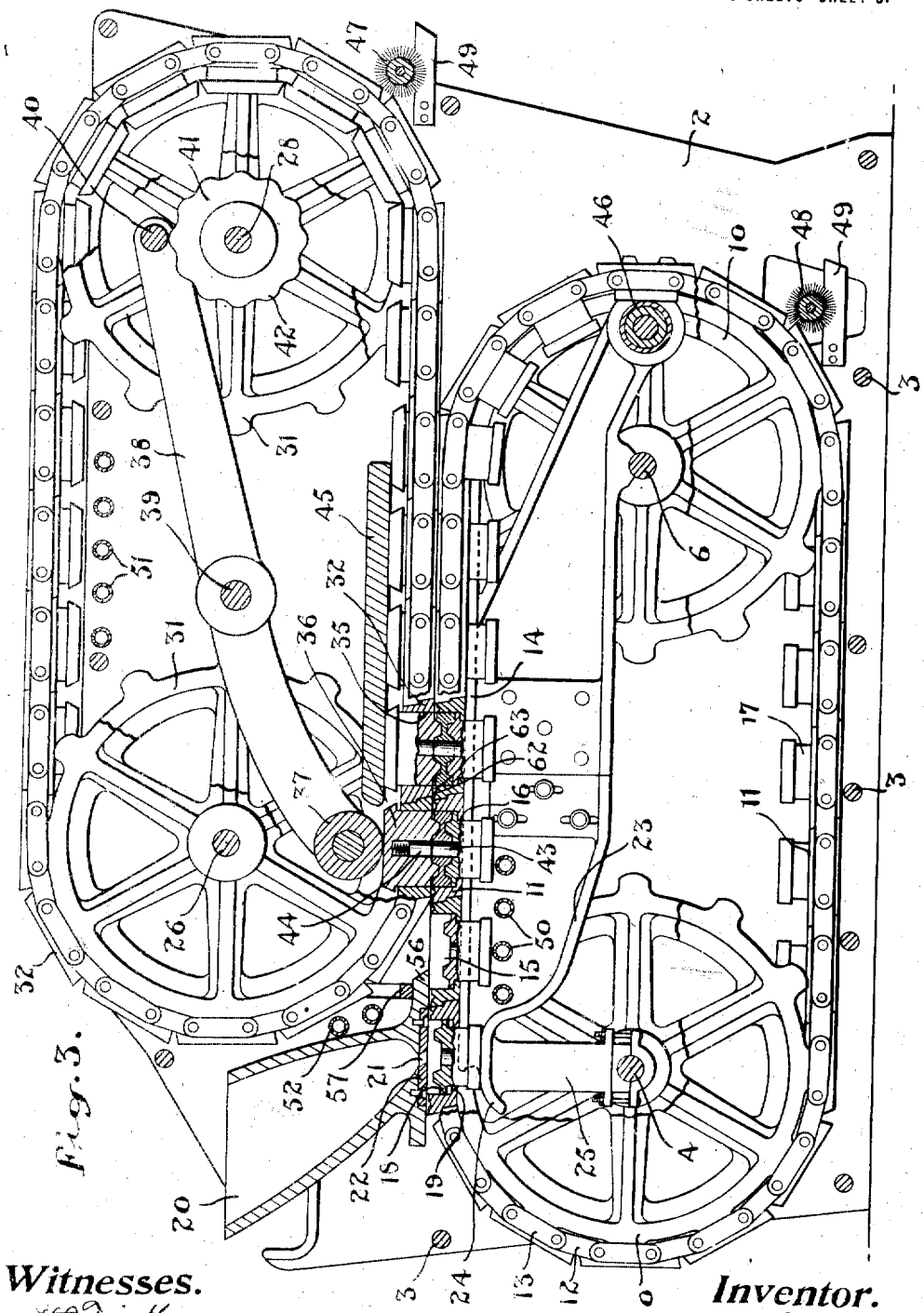

JOHN CARR, OF HAMILTON, ONTARIO, CANADA.

DIE-CASTING MACHINE.

1,248,453.   Specification of Letters Patent.   Patented Dec. 4, 1917.

Application filed November 5, 1914. Serial No. 870,540.

*To all whom it may concern:*

Be it known that I, JOHN CARR, a subject of the King of Great Britain, and resident of the city of Hamilton, county of Wentworth, Province of Ontario, Dominion of Canada, have invented certain new and useful Improvements in Die-Casting Machines, described in the following specification and illustrated in the accompanying drawings, that form part of the same.

The principal objects of the invention are, to materially reduce the cost of molding small articles and to devise a machine which will insure uniformity in size and weight of the molded articles.

The present invention relates to that class of molding machines in which the molds are formed by a plurality of movable members arranged in separable sections and adapted to be brought together to complete the mold, and the principal feature consists in the novel construction and arrangement of parts, whereby the quantity of metal to each mold is accurately gaged and pressure is applied to the upper mold to complete the formation of the article and whereby the completed members are automatically discharged.

In the drawings, Figure 1 is a side elevational view of a machine constructed in accordance with this invention part of the casing for the operating gears being broken away.

Fig. 2 is a plan view and Fig. 3 is a longitudinal vertical mid-sectional view.

Fig. 4 is a detail perspective view of a mold block showing the top thereof.

Like numerals of reference indicate corresponding parts in each figure.

Referring to the drawings, 1 and 2 are the side frames of the machine spaced apart and rigidly connected by the bolts 3 extending therebetween.

4 is a shaft journaled in the bearings 5 in the side frames at one end thereof and 6 is a shaft journaled in the adjustable bearing blocks 7 adjacent to the other end of the machine and in horizontal alinement with the shaft 4.

8 and 9 are adjusting screws engaging the blocks 7 and holding them securely in their adjusted positions.

10 are sprocket wheels secured on the shafts 4 and 6 adjacent to the inner sides of the frame.

11 are the lower mold sections secured together by the links 12 arranged on each side thereof, said links being adapted to ride upon the peripheral face of the sprocket wheels 10 and fitting between the sprocket teeth.

13 are links arranged to the outer sides of the links 12 and adapted to engage the sides of the teeth of the sprocket wheels.

The molds 11 thus form an endless chain and are supported between the pairs of sprocket wheels arranged on each end of the machine and said molds are formed with their front and back edges beveled to fit snugly together when in the horizontal position.

14 are the guide rails arranged on the inner walls of the frames 1 and 2 adapted to engage the under sides of the outer ends of the mold sections 11 forming a rigid under support for said molds in their longitudinal travel.

Each of the molds 11 is formed with a centrally arranged recess 15 and an opening 16 through the bottom.

17 are blocks forming the bottom of the molds having the edge flanges 18 adapted to engage the flanges 19 formed at the bottom of the mold sections 11. The upper faces of the blocks 17 are shaped to the desirable shape of the article to be cast and with the side walls of the recess 15 of the mold sections 11 forms the lower portion of the mold.

20 is the metal feed box secured between the side frames 1 and 2 immediately over the center of the shaft 4 having the discharge opening 21 in the bottom thereof, the under side being provided with a plate 22 which is adapted to engage the upper surface of the mold sections 11 as they pass therebeneath.

23 is a cam plate adjustably secured to the side frames 1 and 2 mid-way between the sprockets 10 and having a forwardly projecting portion 24 extending between said sprockets and adapted to engage the bottoms of the blocks 17 of the molds. This cam projection is adjustably supported from the underside by suitable struts 25 resting upon the shaft 4.

The cam plate 23 is adapted to raise the movable bottoms of the molds upwardly to regulate the quantity of metal flowing from the feed member 20 into the mold and on the passing of the mold sections from beneath the discharge opening 21 the bottom member drops down to its lowermost position.

26 is a shaft journaled in the bearings 27 in the upper part of the frame and arranged rearwardly of the shaft 4.

28 is a shaft supported in the adjustable bearings 29 and in horizontal alinement with the shaft 26, suitable adjusting screws 30 being provided for holding the shaft 28 in its adjusted position.

31 are sprocket wheels secured on the shafts 26 and 28 respectively and arranged in pairs and in the same perpendicular plane as the sprocket wheels 10.

32 is the upper chain mold sections connected together by the links 33 and having the outer links 34 engaging the sides of the sprocket teeth. The upper mold sections are beveled at the front and back edges similarly to the lower mold sections and are formed with central openings 35 therethrough.

36 are the upper die blocks slidably arranged in the openings 35 in the members 32 and having their outer faces formed to the shape of the upper side of the article to be molded.

The upper chains of mold sections are arranged so that the said sections are brought into register with the sections of the lower chain immediately after the filling of the mold with the metal from the feed member 20 and as they move into register, the inner side of the die blocks 36 engage the roller 37 of the rocker arm 38.

The rocker arm 38 is pivoted on a shaft 39 extending between the side frames and the rear thereof is provided with a roller 40 engaging a cam wheel 41, which cam wheel is provided with projections 42 corresponding in number to the links of the chain passing around the sprockets.

As the cam wheel rotates the rocker arm 38 is swung on its pivot to move the roller 37 downwardly, thus forcing the upper die blocks 36 downwardly into the lower mold sections and pressing the fluid metal into the desired shape.

The molds herein shown are of a design for forming small cast wheels and the lower die block is provided with a central pin 43 which forms a core for the wheel, the upper die block being provided with a pin 44 which is spring held downwardly to engage the pin 43.

The upper die blocks 36 in their rearward travel pass beneath the transverse cam plate 45 which holds them down tightly to their position until the cast metal has become sufficiently cool to retain its shape. The spring above the pin 44 then forces the upper die block upwardly on its clearing the plate 45.

The plate member 23 extends rearwardly and is provided on its rearward end with a roller 46 adapted to engage the lower die blocks 17, pushing the same outwardly to discharge the castings from the mold.

47 and 48 are rotary wire brushes carried on a shaft journaled in the bearings 49 and engaging the surface of the dies to clean them off as the chains rotate.

50 are heater tubes arranged beneath the molds 11 close to the feed section and directing jets of flame upwardly against the underside of said mold sections to thoroughly heat the same and to maintain the temperature of the metal as high as possible until the upper die is brought into play. Similar heater tubes 51 are arranged adjacent to the underside of the upper length of the upper dies.

Tubes 52 are also provided adjacent to the bottom of the feed member 20. The means for heating the molds shown may be varied considerably and any suitable means may be utilized in place of gas tubes as shown, without affecting the invention.

The shafts 4 and 26 are operated in unison through a train of gears 53 arranged under a suitable housing 54 on the outer side of the side frames and these are driven through the pulley 55 connected with a suitable source of power.

The feed member 20 is arranged between the side frames and the discharge opening 21 in the bottom thereof is preferably arranged in a diagonal position as shown in dotted lines in Fig. 2 so that there will be a continuous flow from the molten metal from the feed.

The forward flange 56 of the feed member 20 is held in close contact with the upper faces of the mold sections 11 by a bar 57 extending transversely across the frame and spring held downwardly at the ends by the spiral springs 58.

The cam plate 45 is spring held downwardly by means of the springs 59 encircling the end bolts 60 on the outer side of the frame, the said plate extending through a suitable slot 61 in the side frames.

In the use of this device the upper and lower endless chains of the mold sections are rotated in unison through the gears 53 and the molten metal for filling the molds is poured into the receiver 20 and as the lower molds pass thereunder the space therein is filled with the molten metal the cam plate 23 arranged beneath the movable bottom of the molds raising the said bottoms to properly gage the amount of metal desired to be placed in the mold and as the sections pass onwardly beyond the discharge opening 21 of the feed the movable bottoms of the molds drop downwardly just prior to the insertion of the upper die blocks carried by the upper chain of molds. As the upper die blocks enter the mold sections they are pressed downwardly by means of a rocker arm 38 so that the metal within the mold is pressed to the desired shape.

The upper faces of the lower mold sections 11 are formed with the transverse grooves 62 to allow of the escape of any surplus metal and longitudinal grooves 63 are provided communicating with these transverse grooves to allow of ample room for escape of such surplus metal.

As the endless chains travel onwardly the upper and lower sections of the molds separate and the bottom sides of the lower movable die blocks come into contact with the roller 46 which forces them outwardly to effect the discharge of the castings. As the molds continue to move farther along they are brought into contact with the cleansing brushes 47 and 48 which insure their surfaces being thoroughly cleaned prior to being again utilized.

What I claim as my invention is:—

1. In a casting machine, a plurality of molds arranged in an endless belt, means for feeding fluid metal to said molds, dies arranged in an endless belt adapted to slidably close the tops of said molds and to travel therewith, and a presser member mechanically operated to force said dies inwardly to compress and mold the metal in said molds.

2. In a casting machine, a plurality of molds arranged in an endless belt, means for feeding fluid metal to said molds, dies arranged in an endless belt adapted to slidably engage the side walls of said molds and close the tops thereof and to travel therewith, a presser member mechanically operated to force said dies inwardly to compress and mold the metal in said molds, means separate from said presser means for retaining the dies in their inward position for a predetermined period, and means for removing the molded articles from the molds.

3. In a casting machine, two series of mold sections arranged one above the other and adapted to be brought together to form a succession of closed molds, means for feeding fluid metal to the lower mold sections, means for gaging the quantity of metal for each mold, movable dies arranged in the upper set of mold sections and adapted to slidably engage the side walls of the molds, mechanically actuated means for forcing said dies into said molds to compress and mold the metal therein, and means for discharging the molded articles from the molds.

4. In a casting machine, two series of mold sections arranged one above the other and adapted to be brought together to form a succession of closed molds, means for feeding the fluid material to the lower mold sections, movable dies forming the bottoms of the lower mold sections, means for raising said dies while the material is being fed into the molds, movable dies arranged in the upper set of mold sections, means for forcing said dies inwardly to compress and mold the material within the molds, and means for discharging the molded articles from the molds.

5. In a casting machine, two series of mold sections arranged one above the other and adapted to be brought together to form a successsion of closed molds, means for feeding the fluid material to the lower mold sections, movable dies forming the bottoms of the lower molded sections, a cam member arranged beneath the lower mold sections and adapted to engage the under side of the dies as they move beneath the feeding means and to raise them within the molds and gage the material flowing into the mold, movable dies arranged in the upper set of mold sections, means for forcing said dies inwardly to compress and mold the material within the molds, and means for discharging the molded articles from the molds.

6. In a casting machine, two series of mold sections arranged one above the other and adapted to be brought together to form a succession of closed molds, means for feeding the fluid material to the lower mold sections, movable dies forming the bottoms of the lower mold sections, means for raising said dies while the material is being fed into the molds, movable dies arranged in the upper set of mold sections, a movable presser member adapted to engage the upper sides of the movable upper dies and to press them downwardly, means for holding said upper dies in the inward position for a definite period, means for releasing the upper dies, and means adapted to engage the under side of the lower dies and to force them upwardly to discharge the molded articles.

7. In a casting machine, a frame, an endless belt of mold sections open at the top arranged in the lower portion of said frame, an endless belt of mold sections arranged above the foresaid belt and adapted to coöperate with and close the open tops of the lower mold sections in their longitudinal travel, a feed hopper rigidly supported in said frame above the lower mold belt and adapted to engage the upper surfaces of the lower mold sections and having an opening in the bottom adapted to feed the fluid material to the mold as it passes thereunder, die molds carried by the upper mold members adapted to enter the lower molds, and means for forcing said upper die members into the metal contained in the lower mold.

8. In a casting machine, a frame, an endless belt of mold sections open at the top arranged in the lower portion of said frame, a horizontal guide-way adapted to support said mold sections in a horizontal plane in their horizontal travel, an endless belt of mold sections arranged above the aforesaid belt and adapted to engage the upper faces of said lower mold sections, movable dies arranged in said upper mold sections and extending therethrough and adapted to enter the lower mold sections to compress the material therein, a lever member adapted to engage the upper sides of said dies and to force said dies downwardly, means for operating said lever member, and a presser plate adapted to engage the tops of said dies before being released from the pressure exerted by said lever and to hold said dies to their inward position in the molds throughout the major portion of the longitudinal travel of the molds.

9. In a casting machine, a frame, a pair of endless belt members having mold sections adapted to be brought together to form molds, the lower belt member extending beyond the upper member at one end, a feed hopper arranged in said frame above the extending end of the lower belt member and having its underface engaging the upper faces of the mold sections as they pass therebeneath, said hopper having a feed orifice in the bottom adapted to direct the fluid metal into the molds before they are closed, and heating means extending between the sides of said frame adapted to heat the molds and the feed hopper.

10. In a casting machine, a frame, an endless belt formed of mold sections, arranged in the lower part of said frame, movable dies forming the bottoms of said mold sections and adapted to be moved upwardly therein, means for feeding the fluid material to said molds, an upper endless belt of mold sections adapted to close the molds, a member supported beneath the dies of the lower mold sections adapted to engage and move said dies upwardly and hold them in the outward position while the metal is being poured, and means for moving said dies outwardly to discharge the molded articles therefrom.

Signed at the city of Hamilton, county of Wentworth, Ontario, Canada, this fifth day of October, 1914.

JOHN CARR.

Witnesses:
HAROLD PEACE,
JOHN A. ROBERTSON.